United States Patent [19]

Matthews

[11] Patent Number: 5,228,051
[45] Date of Patent: Jul. 13, 1993

[54] TILTED LENS IMAGER IN A LASER AMPLIFIER/OSCILLATOR AND METHOD UTILIZING SAME

[75] Inventor: Steven C. Matthews, Pacific Palisades, Calif.

[73] Assignee: Hughes Aircraft Company, Los Angeles, Calif.

[21] Appl. No.: 808,147

[22] Filed: Dec. 16, 1991

[51] Int. Cl.$^5$ .............................. H01S 3/08; H01S 3/10
[52] U.S. Cl. ..................................... 372/107; 372/99; 372/9; 372/101; 372/108; 359/346; 359/433; 359/719; 359/822
[58] Field of Search ................... 372/99, 101, 107, 29, 372/98, 108, 69, 70, 9; 359/346, 433, 662, 719, 822

[56] References Cited

U.S. PATENT DOCUMENTS

| | | | |
|---|---|---|---|
| 3,914,011 | 10/1975 | Mallinson et al. | 359/433 |
| 3,972,584 | 8/1976 | Lobb | 359/433 |
| 4,029,396 | 6/1977 | Shenker | 359/433 |
| 4,422,046 | 12/1983 | Mumola et al. | 372/94 |
| 4,746,205 | 5/1988 | Cross et al. | 359/859 X |
| 4,894,831 | 1/1990 | Alfrey | 372/19 |
| 5,046,070 | 9/1991 | Negus | 372/101 |
| 5,084,776 | 1/1992 | Watson | 359/9 X |
| 5,140,608 | 8/1992 | Karpol et al. | 372/101 |

FOREIGN PATENT DOCUMENTS 60-241013  11/1985  Japan .............................. 359/433 X

OTHER PUBLICATIONS

Lawrence Livermore National Laboratory, University of California, Report AL 88-22 entitled "Medium Average Power Solid-State Laser Technical Information Seminar", Nov. 4, 1988, Sheets including: (1) Sheet with above title, (2) Table of Contents, (3) Program Overview, (4) We are desigining . . . solid-state technology, by M. A. Summers, (5) Pages 7-1, 7-7 and 7-8.

Primary Examiner—Brian Healy
Attorney, Agent, or Firm—Michael W. Sales; Wanda K. Denson-Low

[57] ABSTRACT

Lenses (30', 32') are orthogonally tilted with respect to one another in a telescope to provide imaging for an amplifier-phase conjugate mirror (PCM)(10) in a laser oscillator/amplifier (12). This mutually orthogonal tilting avoids the problem of air breakdown which occurs when the laser energy is otherwise focused at a single point and thus avoids the need to use a vacuum cell to suppress the sparking at the telescope's focus. An adjustment of the tilting of one lens (32') with respect to the other lens (30') also avoids astigmatism.

5 Claims, 2 Drawing Sheets

ABERRATING MEDIUM IN AMPLIFIER

TILTED LENS IMAGER IN A LASER AMPLIFIER/OSCILLATOR AND METHOD UTILIZING SAME

BACKGROUND OF THE INVENTION

1. Field of the Invention

The present invention relates to a means and method for imaging an optical path in a laser oscillator/amplifier and, more particularly, for imaging an optical path in an amplifier-phase conjugate mirror (PCM).

2. Description of Related Art and Other Considerations

In the prior art, a vacuum is used in an imaging telescope to eliminate the problem of air breakdown, which occurs when laser energy is focused at a single point, for example, discussed in a report AL 88-22 dated Nov. 4, 1988 and entitled "Medium Average Power Solid-State Laser Technical Information Seminar" for the Lawrence Livermore National Laboratory of the University of California, and as described with respect to FIGS. 1–4.

FIGS. 1 and 2 schematically show how a phase conjugate mirror 10, having a window 11, is used to compensate aberrations induced by a solid state laser amplifier 12. As illustrated in FIG. 2(a), an input beam 14, whose wave is identified by indicium 16, is produced by an oscillator 13 (shown in FIGS. 7 and 8) with a spatially uniform phase front which is distorted or deviated, as represented by wave 18 as it passes through some medium 20 in the amplifier in some arbitrary way, generally by thermal conditions affecting the crystal of amplifier 12. An ordinary mirror inverts the distortion as it reflects the beam, shown by wave 22, thereby keeping the distortion fixed with respect to the propagation direction and, upon a second pass through amplifier medium 20, the distortion is doubled, shown by wave 24. As depicted in FIG. 2(c), however, phase conjugate mirror 10 creates a backward going wave 26, known as a Stokes wave, through a process known as stimulated Brillouin scattering. Because the Stokes wave is a phase reversal of the input wave, the same region 20 of the amplifier, which originally created the distortion, now compensates for this distortion as the beam makes a second pass through the amplifier, to exit with the same front shown as wave 28 as the original front of wave 16.

The degree, to which the Stokes wave is an exact conjugate of the pump wave, is determined by the fidelity of the phase conjugation. An important condition for this high fidelity conjugation to occur is that all of the pump wave must be collected by the aperture of the phase conjugate mirror; otherwise, information about the input wave will be lost. Because of effects arising from diffraction or thermal distortion, complete collection of the pump wave is often difficult to achieve where outer portions 14a of beam 14 diverge and may be truncated, such as is shown in FIG. 1.

Anything less than full collection reduces the fidelity of the phase conjugation, in that a portion of the laser energy is not collected at the PCM aperture and, therefore, does not become a factor in the development of the Stokes field. A common method of correcting this problem is to use an imaging system in which, as shown in FIG. 3, the beam must be relayed by positive lenses 30 and 32. Lenses 30 and 32 are used to form an imaging telescope, as this preserves the collimation of the beam. The lenses are separated the distance $f_1 + f_2$, which makes the system afocal. The object and image distances $S_1$ and $S_2$ from the nearest lens are given by the equation $$F_1 + f_2 = mS_1 + S_2/m,$$

where $m = f_2/f_1$.

A problem with imaging in general is that an intermediate focal point 34 (see also FIG. 4) is created. In medium and high power Q-switched laser systems, air breakdown will occur at this focus, causing a plasma arc that completely absorbs the laser radiation. As stated above, this air breakdown problem is normally overcome by placing a vacuum at the focus. Because of optical damage limitations, the use of a vacuum often requires that the entire telescope be integrated with a vacuum chamber, and this integration adds considerably to the complexity and cost of the telescope.

Therefore, the method using a vacuum to eliminate the air breakdown problem, while effective, is a complex and costly method which adds cost and weight to the system. In addition, the integrity of the vacuum is dependent, inter alia, upon the vacuum seal which, for long-lifetime applications, must be a hermetic seal.

SUMMARY OF THE INVENTION

These and other problems are successfully addressed and overcome by the present invention, in which the lenses in an existing system are tilted orthogonally to one another. Further, by adjusting the tilt of one lens with respect to the other, astigmatism can be eliminated.

Several advantages are derived from this arrangement. The problem of air breakdown, which otherwise occurs in prior art devices, is avoided. Other sources of astigmatism, such as a laser amplifier, are automatically compensated for by adjustment of the tilt angle of the second lens, thereby to prevent such sources of astigmatism from affecting the fidelity of the phase conjugator.

Other aims and advantages, as well as a more complete understanding of the present invention, will appear from the following explanation of an exemplary embodiment and the accompanying drawings thereof.

DETAILED DESCRIPTION OF THE PREFERRED EMBODIMENT

Figure 1:
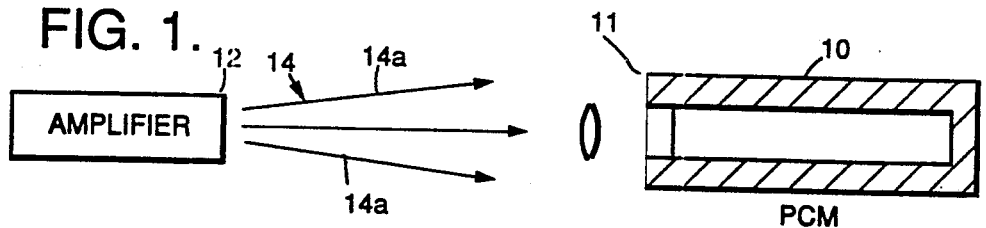
FIG. 1 depicts a conventional optical assembly of a laser amplifier and phase conjugate mirror (PCM), which is arranged for illustrative purposes to show the known phenomenon of how a beam, entering the aperture of the phase conjugate mirror, is truncated, thus resulting in loss of outer portions of the beam.
Figure 2A:
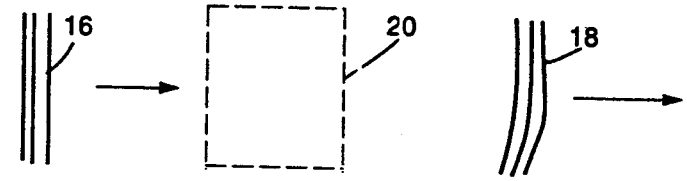
FIGS. 2(a)–(c) are schematic representations of how a phase conjugate mirror (PCM) is conventionally used to compensate for aberrations induced by a solid state laser amplifier.
Figure 2B:
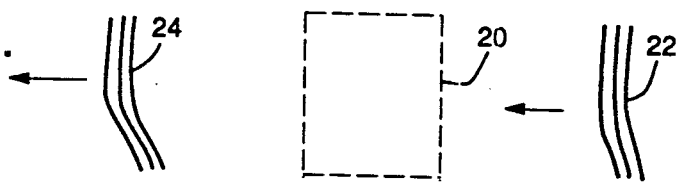
Figure 2C:
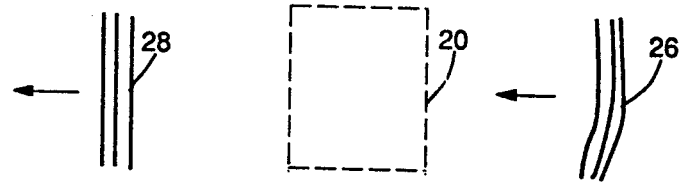
Figure 3:
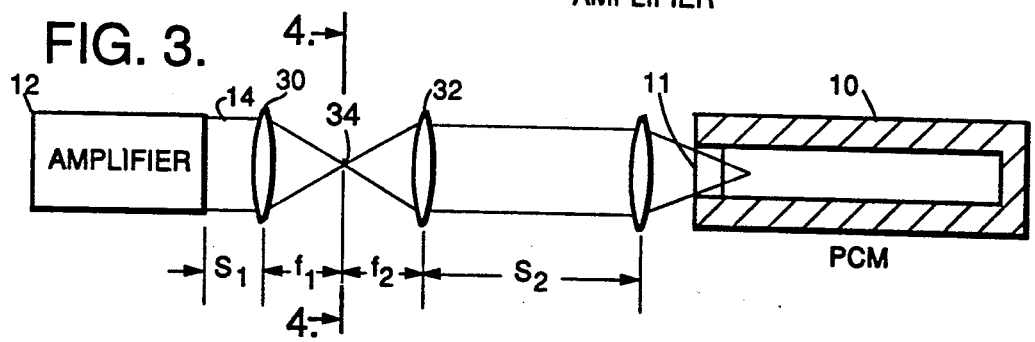
FIG. 3 depicts a common method of correcting the beam truncation problem illustrated in FIG. 2.
Figure 5:
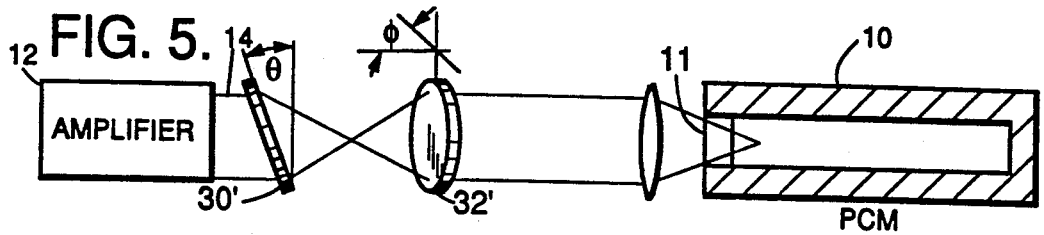
FIG. 5 is a view of an imaging arrangement provided by the present invention.
Figure 4:
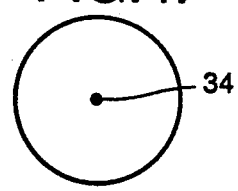
FIG. 4 is a cross-sectional view of a screen if along line 4—4 of FIG. 3 where the beam rays cross at a common intersecting point.
Figure 6:
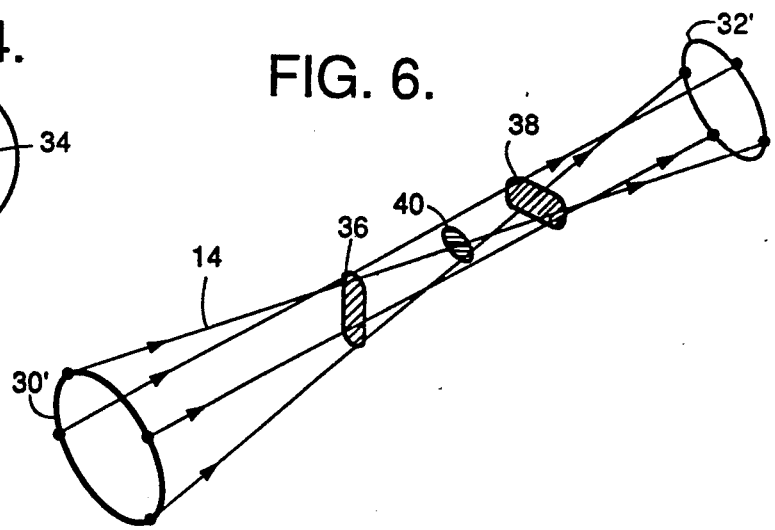
FIG. 6 is an isometric view of the beam provided by the arrangement shown in FIG. 5 and illustrating how point convergence of the beam is avoided.

The present invention provides imaging using such an imaging telescope as described above with respect to the conventional device shown in FIG. 3 but, in this case, lenses 30 and 32 are both tilted at angles $\theta$ and $\phi$ approximating 10° to 20°, as shown in FIG. 5 where the tilted lenses are now denoted respectively by indicia 30' and 32'. Tilting an ordinary lens at such an angle generates a type of optical distortion known as astigmatism, which is characterized by the formation of two separate orthogonal foci 36 and 38 (see FIG. 6), which are separated from each other by a small distance along the optical axis. Because astigmatism is undesirable, it must be corrected in a manner to be described shortly to maintain good fidelity of the phase conjugation. Each of these foci forms a line focus, and cross at a circle 40 instead of at point focus 34 shown in FIGS. 3 and 4. Because the focus occurs at circle 40 instead of at point 34, the optical radiation is not as concentrated and, therefore, does not cause an air breakdown.

In practice, lens angle $\theta$ of lens 30' is adjusted as necessary to suppress the spark, and second lens 32' is then adjusted in angle $\phi$, in the orthogonal axis, to correct for the astigmatism. This method adapts easily to a phase conjugate system because the higher order distortions induced by tilting of these lenses, which are not corrected by having them tilted in orthogonal axes, are corrected by the phase conjugation process, as explained above.

Figure 7:
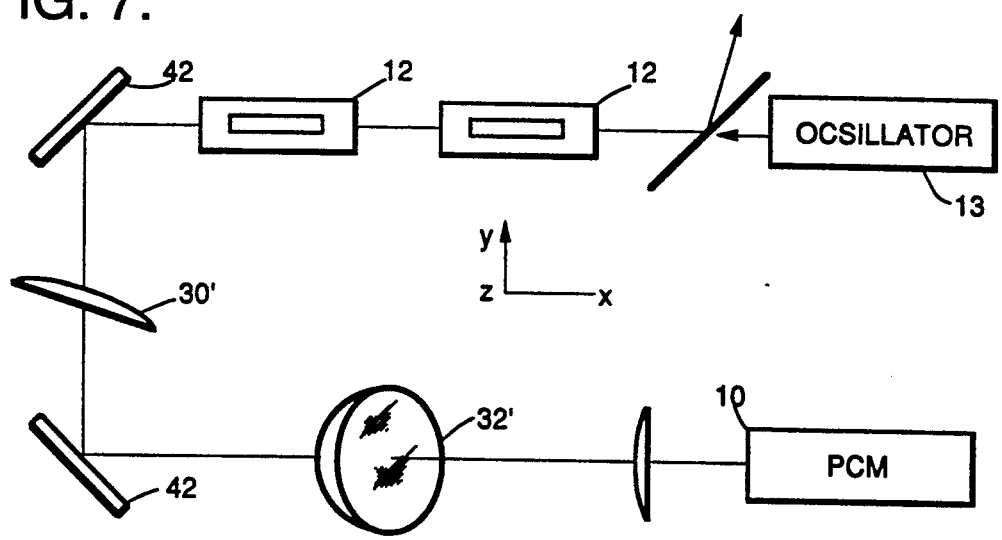
FIG. 7 is a representation of a setup in which the present invention was actually tested.
Figure 8:
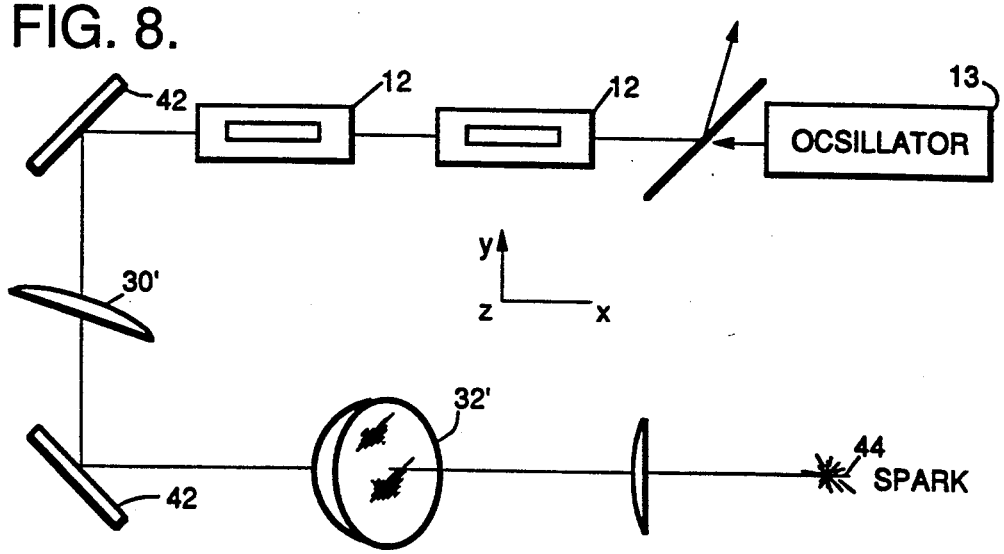
FIG. 8 is a view similar to that of FIG. 7, showing how any astigmatism may be adjusted out of the system, by temporarily removing the phase conjugate mirror and thereafter tilting one of the lenses to obtain sparking at the focus of the phase conjugate mirror.

The present invention was practiced by use of the apparatus depicted in FIG. 7. A pair of tilted lenses 30' and 32', with respective focal lengths of $f_1 = 20$ cm and $f_2 = 30$ cm, forming an imaging telescope, were placed in the path between amplifiers 12 and phase conjugate mirror 10. Fold mirrors 42 were placed in the optical path to compact the system. The focal region for the telescope was between the two lenses. Without the tilt, there was consistent air breakdown at the focus of lens 30'. Lens 30' was then tilted 15°-20° to suppress the sparking. Then, as illustrated in FIG. 8, phase conjugate mirror 10 was temporally removed, and second lens 32' was tilted about an axis orthogonal to that of lens 30' to correct the astigmatism. This process was detected by the consistent presence of a spark 44 at the focus of the PCM lens, which sparking does not occur if there is astigmatism present.

Test results of the transient first pass, as obtained through photographic evidence, confirm that the imaging produced the desired result; otherwise, there would have been a large change in the beam size due to the transient thermal lensing of the amplifier rods. Good fidelity was obtained in the output at steady state, as shown in further photographic evidence, without sparking at the telescope focus.

There are several ways which can be used to implement a phase conjugate mirror, including focused geometry and waveguide geometry, and the present invention is applicable to any.

Although the invention has been described with respect to particular embodiments thereof, it should be realized that various changes and modifications may be made therein without departing from the spirit and scope of the invention. This includes, for example, imaging between amplifier heads within an amplifier chain in order to remove diffraction effects that occur in the traversal of the beam between amplifier heads.

What is claimed is:

1. Apparatus for imaging an optical path disposed along an axis in a laser oscillator/amplifier comprising:
   means for generating and directing a beam of laser energy along the optical path; and
   first and second lenses for maintaining collimation of the beam along the path, said first and second lenses having an intermediate focal point at which air breakdown occurs,
   said lenses being respectively rotated at angles oriented with respect to a normal to the axis of the optical path and orthogonally with respect to one another,
   said first lens being rotated a first angle to suppress the air breakdown, said first angle producing astigmatism in the apparatus.

2. Apparatus according to claim 1 further for imaging an optical path in an amplifier-phase conjugate mirror wherein the angle of said second lens is adjusted with respect to that of said first lens for adjusting astigmatism from the apparatus.

3. A method for imaging an optical path disposed along an axis in a laser oscillator/amplifier comprising the steps of:
   generating and directing a beam of laser energy along the optical path;
   maintaining collimation of the beam along the path; and
   focussing the beam through sites on the optical path which encompass areas which are greater than a single point,
   wherein said focussing step comprises the step of utilizing first and second lenses respectively rotated at angles oriented with respect to a normal to the axis of the optical path and orthogonally with respect to one another, said first and second lenses having an intermediate focal point at which air breakdown occurs, and
   rotating said first lens at a first angle to suppress the air breakdown, said first angle producing astigmatism in the optical path.

4. A method according to claim 3 further for imaging an optical path in an amplifier-phase conjugate mirror further comprising the step of adjusting the rotation of the second lens with respect to the first lens for eliminating astigmatism in the optical path.

5. A method according to claim 4 in which said adjusting step comprises the steps of temporarily moving the first lens from its position in the optical path, and tilting the second lens to provide sparking at the phase conjugate mirror focus.

* * * * *